June 4, 1929.  A. L. BLOOM  1,716,358
SAFETY LOCK AND AUTOMATIC CHAIN TIGHTENER
Original Filed Oct. 12, 1927
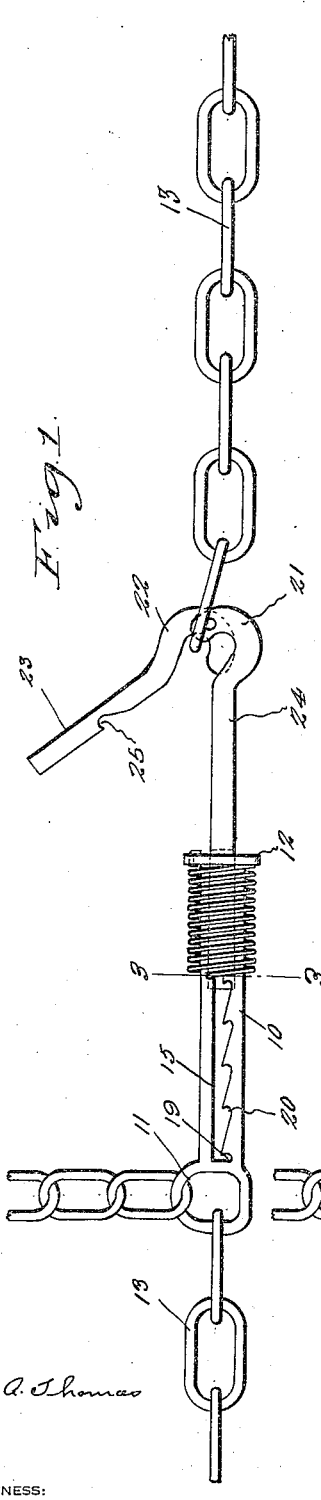
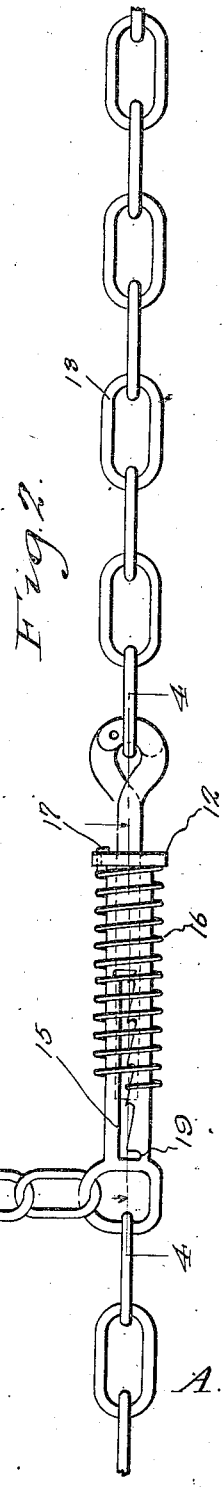
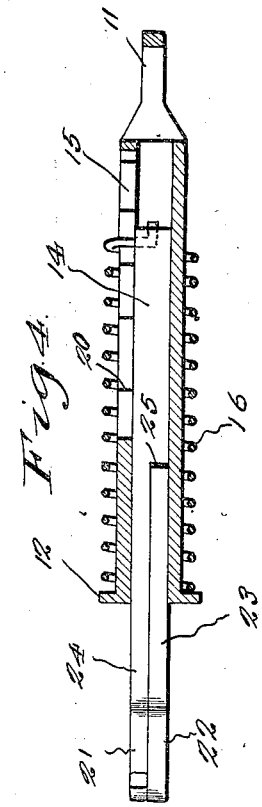
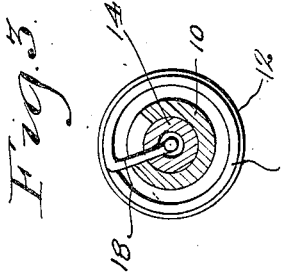
A. L. Bloom
INVENTOR
BY Victor J. Evans
ATTORNEY
WITNESS:

Patented June 4, 1929.

1,716,358

UNITED STATES PATENT OFFICE.

AUGUST L. BLOOM, OF BIG FALLS, MINNESOTA.

SAFETY LOCK AND AUTOMATIC CHAIN TIGHTENER.

Application filed October 12, 1927, Serial No. 225,749. Renewed February 14, 1929.

This invention relates to combined locks and tire chain tightening devices.

An object of the invention comprehends a connecting member adapted for engagement with the adjacent end of a tire chain.

Another object of the invention contemplates a spring member adapted to hold the connecting member closed and to take up slack in the chain.

A further object of the invention consists of a barrel member adapted to receive a connecting member.

More specifically stated the barrel member is provided with notched portions to regulate the tension of the spring upon the connecting member within the barrel and to regulate the amount of slack to be taken out of the chain.

With the above and other objects in view, the invention further consists of the following novel features and details of construction, to be hereinafter more fully described, illustrated in the accompanying drawing and pointed out in the appended claims.

In the drawing:

Figure 1 is a side elevation of the invention, while in use with the connecting member open to receive the adjacent end of a chain.

Figure 2 is a similar view with the connecting member disposed in a locked position.

Figure 3 is a transverse sectional view taken on line 3—3 of Figure 1.

Figure 4 is a longitudinal sectional view taken on line 4—4 of Figure 2.

Referring to the drawing in detail, wherein like characters of reference denote corresponding parts, the reference character 10 indicates a sleeve or barrel having an attaching ring 11 upon one end and an outstanding annular flange portion 12 upon its opposite end. One end of a tire chain 13 has connection with the ring 11. A shank member 14 is slidably mounted within the bore of the sleeve or barrel 10 and which is exposed for an appreciable portion of its length through an elongated slotted portion 15 in the barrel.

A compression spring 16 encircling the barrel 10 is provided with an outwardly offset extremity 17 upon one end extended through the disk member 12. The opposed end is provided with an inwardly offset extremity 18 extended within a transverse opening in the shank 14 and subsequently offset to extend within a longitudinal communicating bore, substantially as illustrated in Figure 4 of the drawing. The elongated slotted portion 15 within the barrel 10 is provided with diagonally disposed recesses 19 at the ends thereof. Tooth portions 20 being provided within one side of the elongated slotted portion and which is adapted to engage the inwardly offset portion 18 of the spring 16 to regulate the inward tension of the shank 14 to remove slack from the chain 13. The connecting member is in addition provided with a half-loop portion 21 upon the outermost end thereof having pivotal connection with a correspondingly shaped portion 22 having a semi-circular shank 23 extended therefrom and adapted to lie flush with a similar portion 24 upon the shank 14. The shoulder 25 as provided upon the shank 14 at the intersection of the reduced portion thereof is adapted to abut the adjacent end of the shank 23, hence the shoulder and the extremity of the shank 23 are beveled to check lateral swinging movement in one direction.

The spring is first compressed to occupy the position as illustrated in Figure 1 of the drawing and to dispose the inwardly offset extremity 18 thereof within the outermost of the diagonally disposed recesses 19. The shank 23 carrying the half-loop portion 22 may then be swung to occupy the position as illustrated in Figure 1 of the drawing to permit connection of the adjacent end of the chain 13 thereof. Such action accomplished, the shank 23 is then shifted to occupy a position in juxtaposition to that of the portion 24 of the shank 14. The barrel 10 is then partially rotated to release the spring from the aforementioned recess. The disposition of the particular offset portion 18 within any one of the tooth portions 20 arranged within one side wall of the elongated slotted portion 15 will regulate the tension of the connecting member upon the chain and take up slack therein.

The spring 16 is not only adapted for taking up slack but which may also be set to cause tension against the teeth 20 to provide the necessary lock. Movement of the shank 14 within the barrel 10 will remove dirt and other extraneous matter from the bore of the barrel and slot 19 through the ring 11. The shank 23 is provided with a notch 25 adapted to receive the connecting end link of the tire chain precedent to insertion of the shank 23 within the bore of the barrel.

The invention is susceptible of various changes in its form, proportions and minor details of construction, and the right is herein reserved to make such changes as properly fall within the scope of the appended claims.

Having thus described the invention, what is claimed is:—

1. A combined lock and chain tightening device comprising a sleeve member provided with an attaching ring upon one end, a shank slidably mounted within the sleeve, a lock carried upon the outer end of the shank and adapted for partial reception within the sleeve, a spring carried upon the sleeve member being adapted for connection with the shank to normally position the same within the bore thereof, and the sleeve being provided with an elongated slotted portion having tooth portions to engage one end of the spring to regulate the inward and outward tension of the shank to remove slack from the chain.

2. A combined lock and chain tightening device comprising a sleeve member provided with an attaching ring upon one end and a disk upon the other, a shank slidably mounted within the bore of the sleeve and having a half-loop upon the outermost end thereof, a companion half-loop pivotally connected with the half-loop of the shank being provided with a stub-shank adapted to coincide with the shank proper, the barrel being provided with an elongated slotted portion having diagonally disposed recesses at its ends and tooth portions upon one side, a compression spring encircling the barrel and having its ends anchored to the flange and innermost end of the shank, and one end of the spring being adapted for selective registration within the recesses and tooth portions.

3. A combined lock and chain tightening device comprising a sleeve member provided with an attaching ring upon one end and a disk upon the other, a shank slidably mounted within the bore of the sleeve and having a half-loop upon the outermost end thereof, a companion half-loop pivotally connected with the half-loop of the shank being provided with a stub-shank adapted to coincide with the shank proper, the barrel being provided with an elongated slotted portion having diagonally disposed recesses at its ends and tooth portions upon one side, a compression spring encircling the barrel and having its ends anchored to the flange and innermost end of the shank, one end of the spring being adapted for selective registration within the recesses and tooth portions, and the shank of the companion half-loop being provided with a notch adapted to receive the connecting end link of a side chain precedent to disposing said shank within the sleeve member.

In testimony whereof I affix my signature.

AUGUST L. BLOOM.